United States Patent
Takizawa

(10) Patent No.: US 8,218,300 B2
(45) Date of Patent: Jul. 10, 2012

(54) ELECTRONIC APPARATUS

(75) Inventor: Tomohiro Takizawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/101,691

(22) Filed: May 5, 2011

(65) Prior Publication Data
US 2011/0211307 A1  Sep. 1, 2011

Related U.S. Application Data

(63) Continuation of application No. 12/585,703, filed on Sep. 22, 2009, now Pat. No. 8,050,018.

(51) Int. Cl.
*G06F 1/16* (2006.01)

(52) U.S. Cl. ............... 361/679.06; 361/679.27; 248/917; 248/918

(58) Field of Classification Search ............. 361/679.06, 361/679.27
See application file for complete search history.

(56) References Cited

U.S. PATENT DOCUMENTS

| | | | |
|---|---|---|---|
| 5,724,224 | A | 3/1998 | Howell et al. |
| 5,959,833 | A * | 9/1999 | Youens ............... 361/679.27 |
| 6,347,040 | B1 | 2/2002 | Fries et al. |
| 6,771,494 | B2 * | 8/2004 | Shimano ............... 361/679.06 |
| 7,099,496 | B2 | 8/2006 | Benkley, III |
| D532,051 | S | 11/2006 | Sugino et al. |
| 7,239,505 | B2 | 7/2007 | Keely et al. |
| 7,489,507 | B2 | 2/2009 | Karashima et al. |
| 7,545,621 | B2 | 6/2009 | Haddad |
| 7,652,873 | B2 | 1/2010 | Lee |
| 2002/0109962 | A1 | 8/2002 | Tseng et al. |
| 2004/0012920 | A1 | 1/2004 | Tanimoto et al. |
| 2004/0105227 | A1 | 6/2004 | Tanimoto et al. |
| 2004/0228081 | A1 * | 11/2004 | Lee ............... 361/683 |
| 2005/0007739 | A1 * | 1/2005 | Hata et al. ............... 361/699 |
| 2005/0063148 | A1 * | 3/2005 | Tago ............... 361/683 |
| 2005/0063149 | A1 | 3/2005 | Shimamoto et al. |

(Continued)

FOREIGN PATENT DOCUMENTS

CN  2638401 Y  9/2004

(Continued)

OTHER PUBLICATIONS

USPTO, (Edwards) Notice of Allowance and Notice of Allowability, Sep. 2, 2011, in parent U.S. Appl. No. 12/585,703 [now allowed].

(Continued)

*Primary Examiner* — Anthony Q Edwards
(74) *Attorney, Agent, or Firm* — Fujitsu Patent Center

(57) ABSTRACT

A center section of the upper edge of the rotation member which is rotatable with friction with respect to a first housing in an arrow direction A-A by using, as a rotation shaft, a first shaft which forms a rotation shaft in parallel with a rear edge of the first housing, and a center section of a lower edge of a second housing which is openable and closable with respect to the first housing in the arrow direction A-A and which is rotatable in an arrow direction B-B in an opened state, are connected to each other rotatably in the arrow direction B-B a the second shaft which is perpendicular to the first shaft, and which, when the second housing is in a vertically opened state, is inclined at 45° in a direction in which the second shaft is tilted forward.

2 Claims, 9 Drawing Sheets

U.S. PATENT DOCUMENTS

| | | | |
|---|---|---|---|
| 2005/0105263 | A1 | 5/2005 | Tanaka et al. |
| 2006/0044743 | A1 | 3/2006 | Ito et al. |
| 2006/0203437 | A1 | 9/2006 | Lev et al. |
| 2006/0209500 | A1 | 9/2006 | Park |
| 2006/0267947 | A1 | 11/2006 | Nishiyama et al. |
| 2006/0279920 | A1 | 12/2006 | Lee et al. |

FOREIGN PATENT DOCUMENTS

| | | |
|---|---|---|
| JP | 2001-90304 | 4/2001 |
| JP | 2003-330590 | 11/2003 |
| JP | 2004-053927 | 2/2004 |
| JP | 2004-240478 | 8/2004 |
| JP | 2005-117270 | 4/2005 |
| JP | 2006-033330 | 2/2006 |
| JP | 1279770 | 8/2006 |
| JP | 2006-331287 | 12/2006 |
| WO | WO-98/29795 A1 | 7/1998 |

OTHER PUBLICATIONS

USPTO, [Edwards] "U.S. Appl. No. 12/585,703 (parent)," [CTNF] Non-Final Rejection issued on Aug. 20, 2010.

USPTO, [Edwards] "U.S. Appl. No. 12/585,703 (parent)," [NOA] Notice of Allowance and Fees Due issued on Apr. 11, 2011.

German Office Action issued on Nov. 23, 2009 in corresponding German Patent Application 112007003379.7.

International Search Report for PCT/JP2007/056430, mailed Jun. 12, 2007.

English Translation of the International Preliminary Report on Patentability mailed Oct. 29, 2009 and issued in corresponding International Patent Application PCT/JP2007/056430.

Korean Intellectual Property Office (KIPO); Official Action mailed Apr. 18, 2011, in connection with correspondent foreign application KR 10-2009-7018846; English-language translation provided.

USPTO, [Edwards] "U.S. Appl. No. 12/585,703 (parent)," [NOA] Notice of Allowance and Fees Due issued on May 27, 2011.

Japanese Office Action mailed Aug. 2, 2011 for corresponding Japanese Application No. 2009-506164, with English-language translation.

Chinese Office Action mailed Jul. 25, 2011 for corresponding Chinese Application No. 200780052121.9, with English-language translation.

* cited by examiner

ELECTRONIC APPARATUS

CROSS-REFERENCE TO RELATED APPLICATION

This is a continuation application of PCT/JP2007/56430, filed on Mar. 27, 2007.

TECHNICAL FIELD

The present invention relates to an electronic apparatus including a first housing, and a second housing which is openable, closable and rotatable with respect to the first housing.

BACKGROUND ART

Conventionally, there have been widely used electronic apparatuses which are represented by a notebook type personal computer, a portable telephone, a portable information terminal, and the like, and which are excellent in portability. In many cases, such electronic apparatuses include, for convenience of carriage, a main unit, on the upper surface of which operation keys such as character keys and numerical keys are arranged, and an image display unit which has a display screen and which is openable and closable with respect to the main unit. In such electronic apparatuses, it is possible to obtain information through the display screen by operating the operation keys arranged on the upper surface of the main unit.

Further, in recent years, there has also been developed and commercialized an electronic apparatus that has a touch panel, and the like, incorporated therein so as to also be able to cope with a usage form in which an instruction input, and the like, to the electronic apparatus is performed by bringing a finger or a dedicated pen into contact with or close to the display screen so that the position of the finger or the dedicated pen is recognized without inputting through the key. As such an electronic apparatus, there are known, for example, a palm-sized portable information terminal having limited processing capability (see, for example, Japanese Laid-Open Patent Publication No. 2003-330590), a tablet-type personal computer (hereinafter abbreviated as tablet PC), and the like.

Further, as the tablet PC, in addition to a so-called pure tablet PC which has a display screen on the upper surface thereof and which is formed in a plate shape as a whole, there is also known a convertible type tablet PC which is configured to include an image display unit that may be freely opened and closed with respect to a main unit, and which is configured by connecting the image display unit and the main unit to each other by using a connecting section having a high degree of freedom, in such a manner that not only the opening and closing of the image display unit but also the front and rear rotation of the image display unit may be performed so as to obtain a state in which the image display unit is closed with the display screen facing upward, and which is convenient for the usage form that an instruction input, and the like, is performed with a finger or a dedicated pen (see, for example, Japanese Laid-Open Patent Publication No. 2004-53927).

Generally, in the convertible type tablet PC, various buttons are arranged at a side of the display screen, or images of various buttons are displayed on the display screen, in order to obtain good operability at the time when the tablet PC is set in the tablet mode in which the image display unit is closed with the display screen facing upward. As such buttons, there are known, for example, a button for scrolling the screen, a button for performing the same processing as the processing performed at the time when a Ctrl key, an Alt key and a Del key in a common keyboard are simultaneously depressed, a button for switching a direction of an entire image displayed in the display screen, a button to which a desired function may be assigned by an operator, a button corresponding to the Enter key in a common keyboard, and the like.

Further, for the convertible type tablet PC, the display screen size is desired to be increased in order to increase the amount of display information and to improve the operability, while the outside shape size of the tablet PC is also desired to be reduced in order to improve the portability. That is, the outside shape of the apparatus may not be made smaller than the display screen area, but the miniaturization is desired in the sense that the outside shape of the apparatus is reduced as much as possible to the ends of the display screen so that the area of the peripheral portion of the display screen is reduced as much as possible.

However, when the buttons are arranged at sides of the display screen as described above, it is necessary to reduce the display screen area in correspondence with the space in which the buttons are arranged. Further, in the case where the images of the buttons are displayed on the display screen, the display screen may be extended as close as possible to the end of the outside shape of the apparatus. However, the space to display the images of the buttons is needed on the display screen, and hence the area to display an image other than the images of the buttons is reduced. Further, in the case where the buttons are arranged at the sides of the display screen or where the images of the buttons are displayed on the display screen, when the tablet PC is in the notebook PC mode in which the image display unit is opened with respect to the main unit, and when the buttons are operated by a finger or a dedicated pen, a large rotation moment may be applied with the hinge rotatably supporting the image display unit as a rotation shaft, and thereby the image display unit may be unintentionally rotated.

Further, as an electronic apparatus configured to cope with such problem, there is proposed a convertible type tablet PC including an image display unit which is openable, closable and rotatable with respect to the main unit, the tablet PC being configured such that buttons and a fingerprint sensor are arranged at the left side of a keyboard arranged on the upper surface of the main unit, and such that when the tablet PC is in the tablet mode in which the image display unit is closed with the display screen being oriented upward, the buttons and the fingerprint sensor are exposed (see, for example, Japanese Design Registration No. 1279770).

According to the convertible type tablet PC proposed in Japanese Design Registration No. 1279770, the buttons and the fingerprint sensor which are arranged at the left side of the keyboard on the upper surface of the main unit may be used at the time when the tablet PC is in the tablet mode. Thus, it is possible to obtain good operability without the buttons being arranged at the side of the display screen arranged in the image display unit or without the images of buttons being displayed on the display screen. Therefore, it is possible to extend the display screen as close as possible to the end of the outside shape of the apparatus, and it is also possible to avoid a decrease of an area of the display screen for displaying an image by displaying the images of the buttons on the display screen. Further, in the case where the tablet PC is in the notebook PC mode in which the image display unit is opened with respect to the main unit, it is possible to avoid an unintentional rotation of the image display unit at the time when the tablet PC is operated with a finger or a dedicated pen.

DISCLOSURE OF INVENTION

However, in the convertible type tablet PC proposed in Japanese Design Registration No. 1279770 described above, when the tablet PC is in the tablet mode, the left side of the keyboard arranged on the upper surface of the main unit is exposed, and the buttons and the fingerprint sensor are arranged at the left side of the keyboard. Thus, it is necessary to increase the size of the main unit by the space in which the buttons and the fingerprint sensor are arranged, so that the portability of the tablet PC is impaired. Further, in order to avoid an increase in the size of the main unit, it is necessary to reduce the length in the lateral width direction of the area on the upper surface of the main unit, in which area the keyboard is arranged. In this case, the operability of the keyboard may be lowered.

Further, in the convertible type tablet PC proposed in Japanese Design Registration No. 1279770 described above, the image display unit is projected to the right side from the main unit at the time when the tablet PC is in the tablet mode. Thus, in such a case where a load is applied to the projected portion, for example, by an arm being placed on the projected portion, a rotation moment may be applied with the hinge rotatably supporting the image display unit as a rotation shaft, so that the state of the tablet PC is made unstable.

The present invention has been made in view of the foregoing. An object of the present invention is to provide an electronic apparatus which may obtain good operability and stability, without impairing portability, in the case where the electronic apparatus is used in the state in which the second housing is closed onto the first housing with the rear surface, opposite to the front surface of the second housing, facing upward, for example, in such a case where the image display unit is closed onto the main unit with the display screen facing upward.

According to an aspect of the invention, an electronic apparatus that includes a first housing, and a second housing which is openable, closable and rotatable with respect to the first housing, the electronic apparatus includes:

a first shaft that is arranged at a rear edge of the first housing and that forms a rotation shaft in parallel with the rear edge;

a rotation member that is rotatable with respect to the first housing with the first shaft as a rotation shaft; and a second shaft that rotatably connects a center section of a lower edge of the second housing in an opened state of the second housing to a center section of an upper edge of the rotation member, and that is perpendicular to the first shaft, an upper portion of the second shaft inclining in a direction in which the upper portion of the second shaft is tilted forward when the second housing is in a state where the second housing is vertically opened, wherein the electronic apparatus further comprises a first closed state where the front surface of the second housing is closed facing an upper surface of the first housing, and a second closed state where the rear surface opposite to the front surface of the second housing is closed facing the upper surface of the first housing in a state where a partial area of a front edge side of the upper surface of the first housing is exposed.

The electronic apparatus according to the present invention is configured such that the center section of the upper edge of the rotation member which is rotatable with friction with respect to the first housing by using, as a rotation shaft, the first shaft forming the rotation shaft in parallel with the rear edge of the first housing, and the center section of the lower edge of the second housing which is openable, closable and rotatable with respect to the first housing in the opened state of the second housing, are rotatably connected to each other by a second shaft which is perpendicular to the first shaft, and which is inclined in the direction that the upper portion of the second shaft is tilted forward at the time when the second housing is vertically opened. Therefore, a partial area of the front edge side of the upper surface of the first housing is exposed in the second closed state where the rear surface opposite to the front surface of the second housing is closed toward the upper surface of the first housing. The partial area of the front edge side of the upper surface of the first housing, which area is exposed in the second closed state, generally has a relatively sufficient space as compared with a partial area on the left and right edge sides of the upper surface of the first housing. Thus, according to the electronic apparatus of the present invention, various buttons, a fingerprint sensor, and the like, may be arranged in the partial area of the front edge side of the electronic apparatus without impairing the portability. With such arrangement, it is possible to obtain good operability in the second closed state. Further, according to the electronic apparatus of the present invention, the second housing does not project laterally over the first housing in the second closed state. Therefore, it is significantly less likely that the rotation moment acts with the second shaft as the rotation shaft in such a case where a load is applied to the front surface of the second housing, for example, by putting an arm on the front surface. Thus, the electronic apparatus according to the present invention is excellent in the stability. Further, according to the electronic apparatus of the present invention, the thickness of the portion of the first housing, which portion is exposed in the second closed state, is reduced by the amount in which the second housing does not overlap with the first housing. Thus, the electronic apparatus according to the present invention is excellent in the holding property when it is held in the second closed state.

Here, in the electronic apparatus according to the aspect of the invention, it is preferable that the first housing is provided with an operation member which is operated by a user in the partial area of the front edge side.

The electronic apparatus in which such operation members are arranged has excellent operability because the operation members may be operated even in the opened state where the second housing is opened with respect to the first housing, and in the second closed state described above. Further, as described above, the front edge side partial area has a relatively sufficient margin in space, and accordingly it is possible to secure a sufficient size of the operation members.

In addition, in the electronic apparatus according to the aspect of the invention, it is acceptable that the operation member is a push button or the operation member is a slide button.

In addition, in the electronic apparatus according to the aspect of the invention, it is preferable that the first housing is provided with a fingerprint sensor to authenticate a user by identifying a fingerprint in the partial area of the front edge side.

The electronic apparatus in which such fingerprint sensor is arranged has excellent operability because it is possible to perform user authentication even in the opened state where the second housing is opened with respect to the first housing, and also in the second closed state.

Further, in the electronic apparatus according to the aspect of the invention, it is preferable that the first housing is provided with a keyboard with a plurality of operation keys arranged therein on the upper surface of the first housing, and the second housing is provided with a display screen to display an image on the front surface of the second housing.

The front edge side partial area of the upper surface of the first housing, which area is exposed in the second closed state, may be an area between the keyboard arranged on the upper surface of the first housing and the front edge of the first housing. This area has a relatively sufficient margin in space as compared with the area between the keyboard and the left edge or the area between the keyboard and the right edge. Therefore, if the various buttons and the fingerprint sensor are arranged in the front edge side partial area, it is not necessary that, in order to arrange the buttons and the fingerprint sensor, the size of the first housing is increased or the length in the lateral width direction of the area for arranging the keyboard is reduced. Thereby, it is possible to obtain excellent operability without sacrificing the portability and the operability of the keyboard. Further, a circuit board, on which a CPU for performing operation processing and an electronic circuit are mounted, and a hard disk which stores information are generally incorporated in the first housing on which the keyboard is arranged. In the case where the various buttons and the fingerprint sensor are arranged in the front edge side partial area of the upper surface of the first housing, the risk of failures due to a wire breakage, and the like, is reduced as compared with a conventional electronic apparatus in which the various buttons and the fingerprint sensor are arranged at the side of the display screen arranged in the second housing that is openable, closable and rotatable with respect to the first housing, and with a conventional electronic apparatus in which the various buttons are arranged on the display screen. Further, in the electronic apparatus according to the present invention, it is not necessary to arrange the various buttons and the fingerprint sensor at the side of the display screen arranged in the second housing, and it is not necessary to arrange the various buttons on the display screen. Thereby, it is possible to extend the display screen as close as possible to the end of the second housing, and it is also possible to avoid a decrease of the image display area by displaying the various buttons on the display screen.

In addition, in an electronic apparatus being provided with a display screen of the electronic apparatus according to the aspect of the invention, it is preferable that the display screen includes a pen input function to detect a contact or an approach of a pen.

In the electronic apparatus according to the present invention, it is not necessary that the various buttons and the fingerprint sensor are arranged at the side of the display screen arranged in the second housing, and that the various buttons are displayed on the display screen. Thus, in the opened state where the second housing is opened with respect to the first housing, it is possible to avoid the unintentional rotation of the second housing at the time when the electronic apparatus is operated with a finger or a pen.

In addition, in the electronic apparatus according to the aspect of the invention, it is preferable that the first housing is a housing in which a front end surface of the first housing is formed from an inclined surface which connects a front edge of the upper surface and a front edge of the bottom surface of the first housing to each other.

According to the preferred aspect as described above, it is possible to improve the appearance.

In addition, in the electronic apparatus according to the aspect of the invention, it is preferable that the rotation member is rotatable with friction with respect to the first housing.

According to the preferred aspect as described above, the attitude of the second housing in the opened state may be preferably held at a desired position.

In addition, in the electronic apparatus according to the aspect of the invention, it is preferable that the lower edge of the second housing in the opened state of the second housing, and the upper edge of the rotation member are surfaces both being perpendicular to the second shaft.

According to the preferred aspect as described above, the gap between the lower edge and the upper edge may be designed so as to be minimized.

Further, in the electronic apparatus according to the aspects of the invention, it is also preferable that in the state where the second housing is vertically opened, the second shaft is inclined by 45° in the direction in which the upper portion of the second shaft is tilted forward.

Furthermore, in the electronic apparatus according to the invention, it is also preferable that the first shaft is formed from a pair of members which are respectively arranged at both ends of the rear edge of the first housing to form the rotation shaft, and the rotation member includes, at both ends thereof, two connecting sections which are connected to the pair of members, respectively.

According to the preferred aspects as described above, it is possible to stably rotate the rotation member with respect to the first housing.

According to the present invention, it is possible to provide an electronic apparatus in which is capable of realizing excellent operability and stability are obtained, without deteriorating portability, in the closed state where the rear surface opposite to the front surface of the second housing that is openable, closable and rotatable with respect to the first housing, is closed toward the upper surface of the first housing.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is rotated with respect to the main unit is seen from obliquely above the side surface of the tablet PC.

FIG. 7 is grasped by the user.

BEST MODE FOR CARRYING OUT THE INVENTION

In the following, an embodiment according to the present invention will be described with reference to the accompanying drawings.

Here, description will be given by taking, as an example, a case where an electronic apparatus according to the present invention is a so-called a convertible type tablet type personal computer (hereinafter, convertible type tablet type personal computer abbreviated as tablet PC) that includes: a main unit in which a circuit board with a CPU for performing operation processing and an electronic circuit mounted thereon, a hard disk for storing information, and the like, are incorporated, and which serves as a keyboard with plural operation keys arranged on the upper surface thereof; and an image display unit which is freely opened and closed with respect to the main unit and which is freely rotated with respect to the main unit, and on the front surface of which a display screen for displaying an image is arranged, and that is a type in which an instruction is inputted by bringing a finger or a dedicated pen in contact with or close to the display screen so that the position of the finger or the dedicated pen is recognized.

Figure 1:
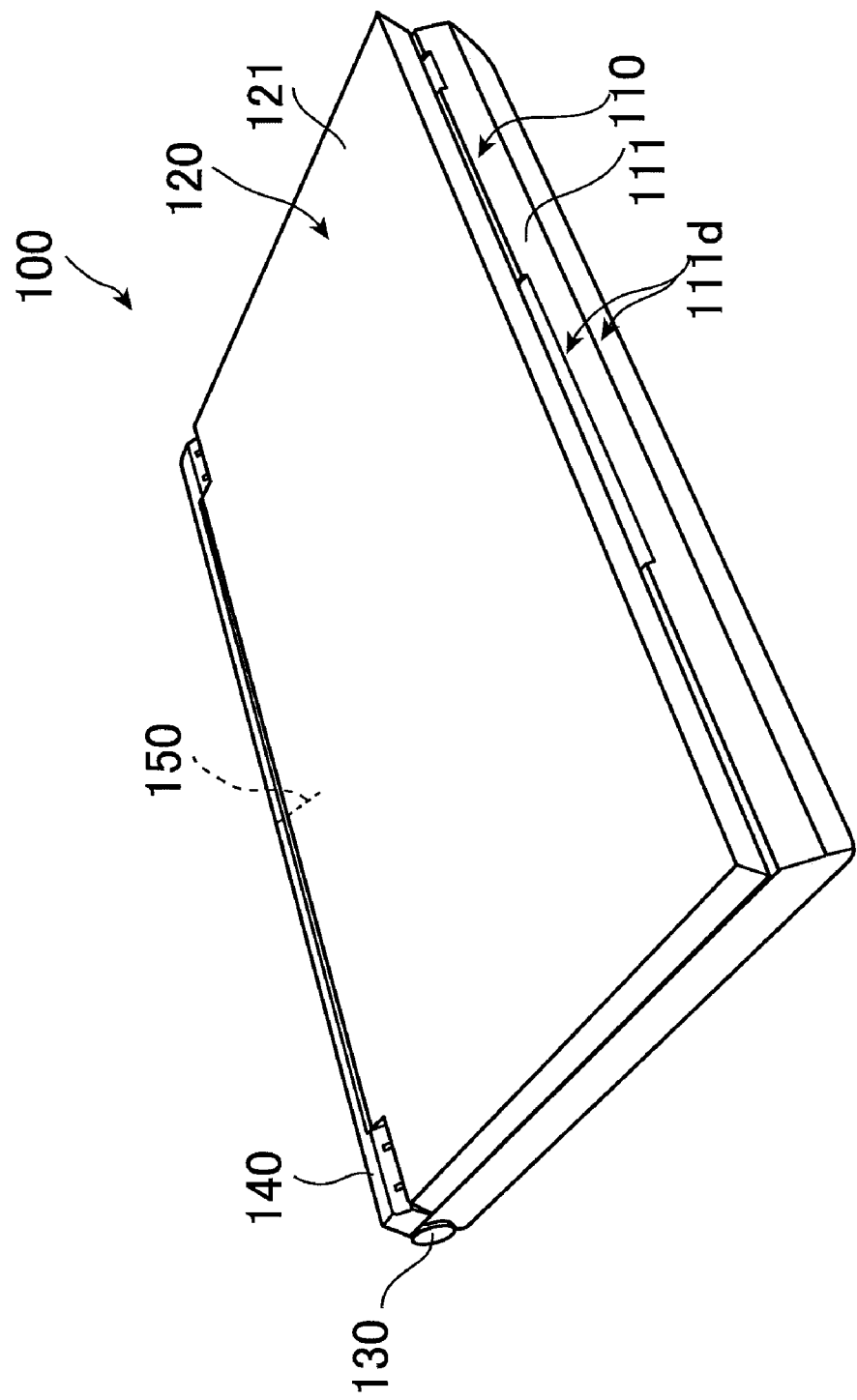
FIG. 1 is an external perspective view in which a first closed state where a front surface of an image display unit of a tablet PC, as an embodiment of the electronic apparatus according to the invention, is closed facing the upper surface of a main unit is seen from obliquely above a front surface of the tablet PC.
Figure 2:
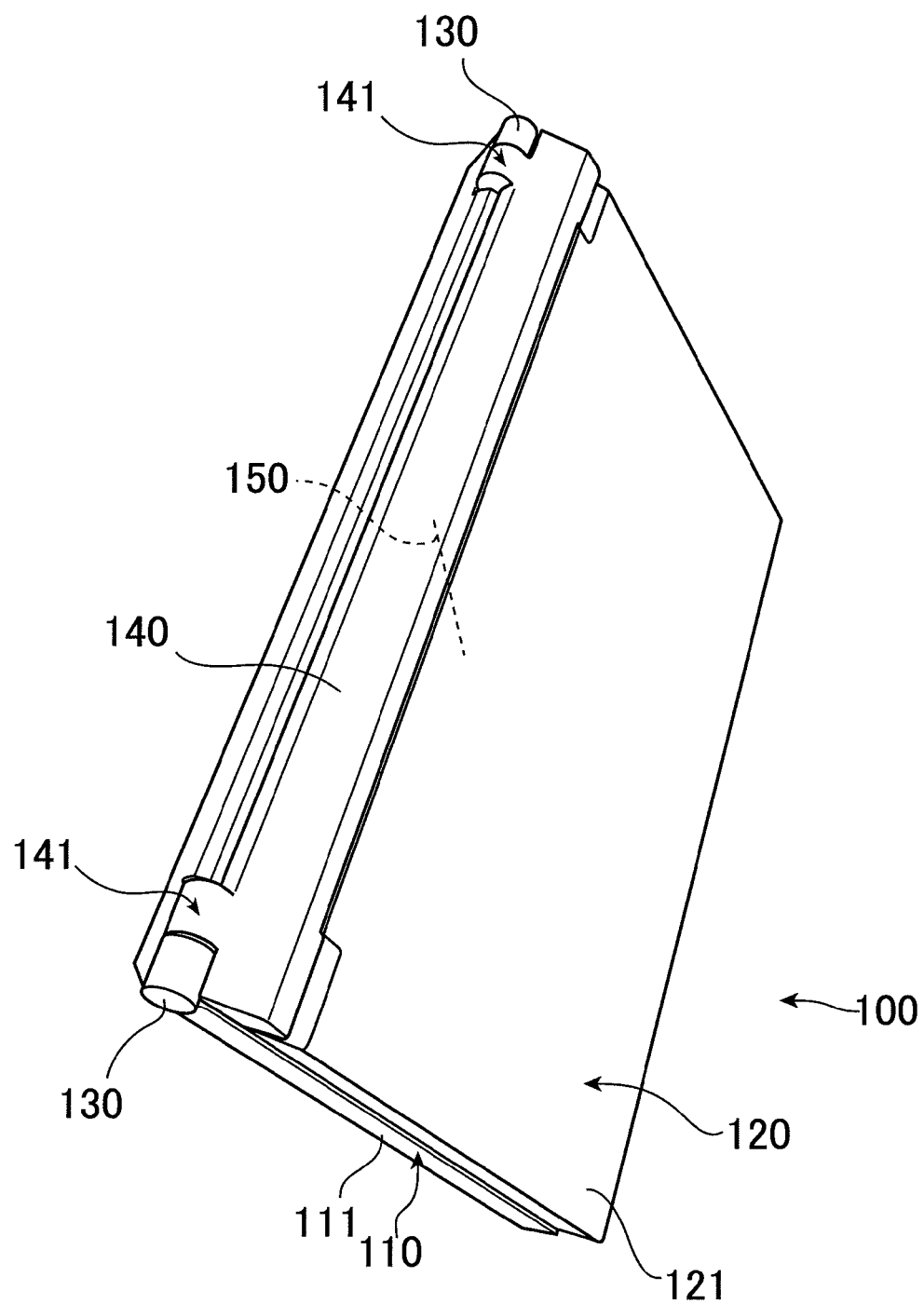
FIG. 2 is an external perspective view in which the tablet PC illustrated in FIG. 1 is seen from obliquely above a rear surface of the tablet PC.
Figure 3:
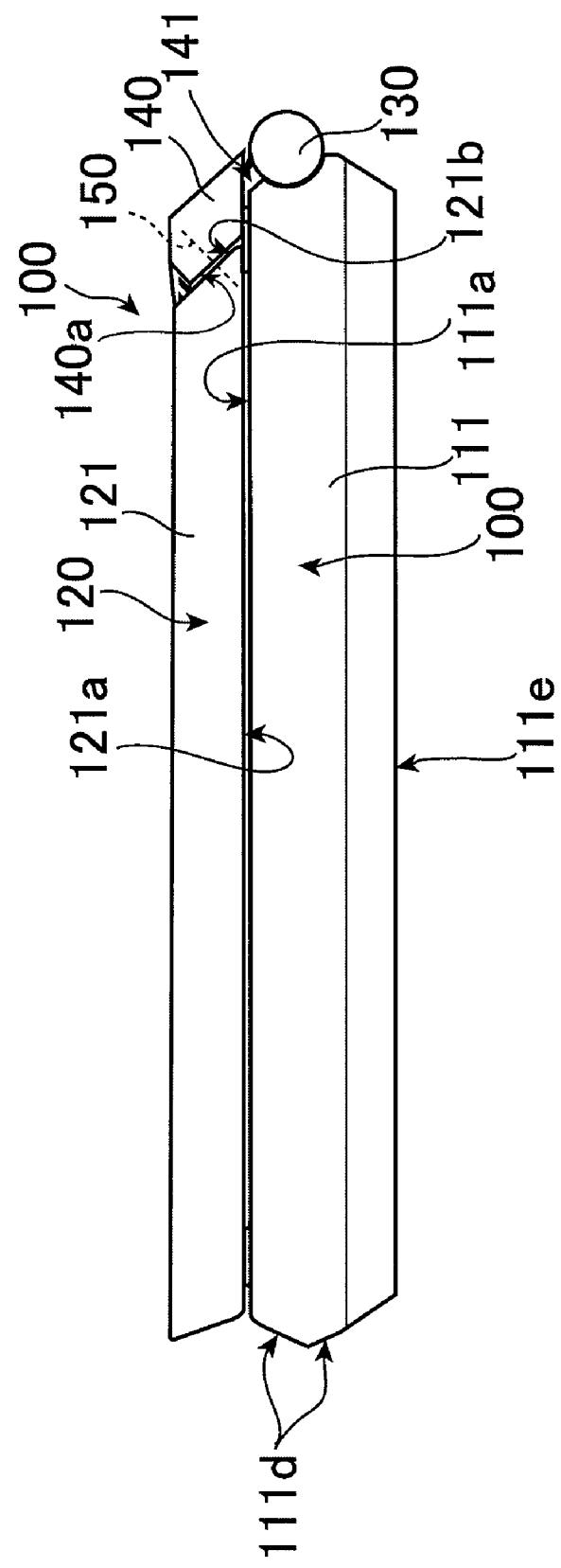
FIG. 3 is an external perspective view in which the tablet PC illustrated in FIG. 1 is seen from a side surface of the tablet PC.
Figure 4:
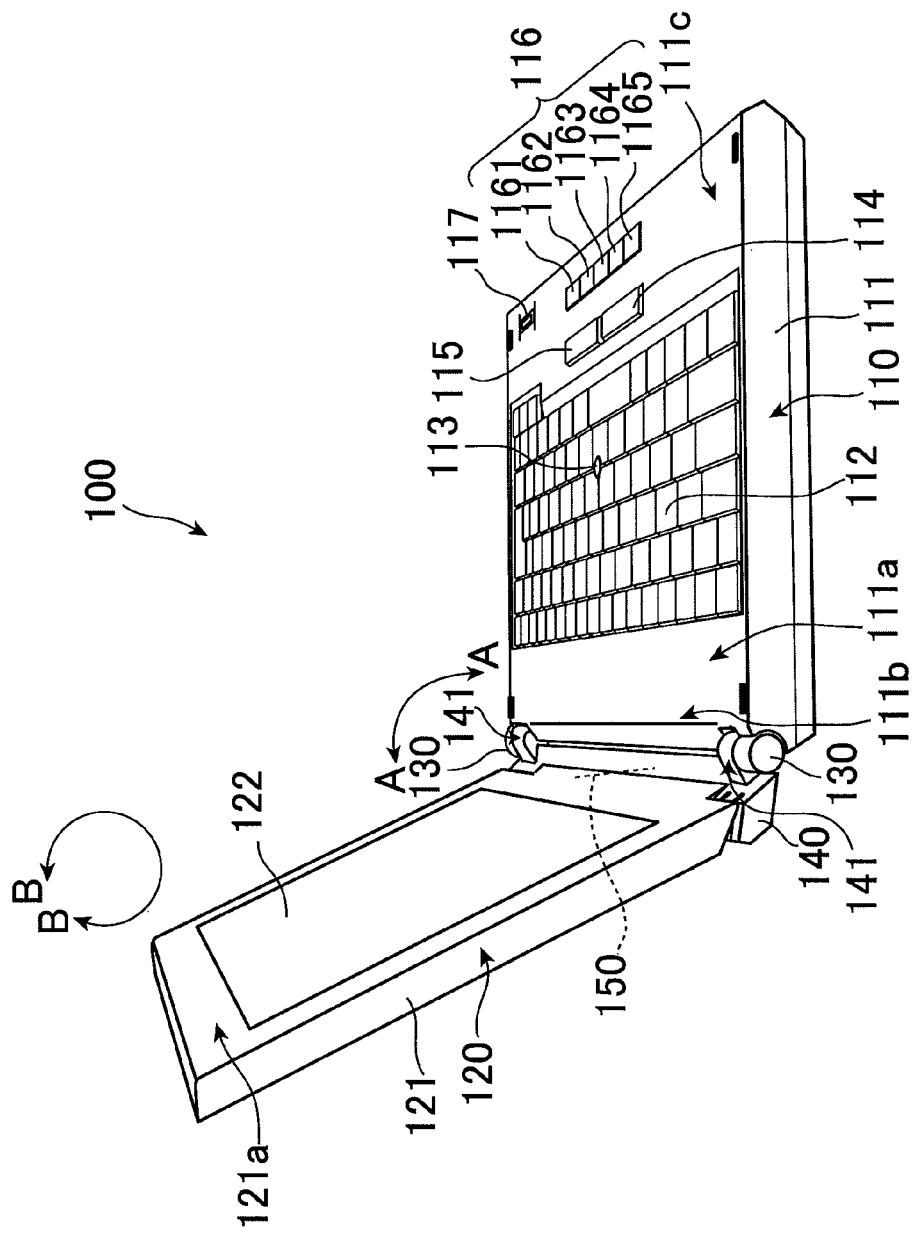
FIG. 4 is an external perspective view in which an opened state where the image display unit of the tablet PC illustrated in FIG. 1 to FIG. 3 is opened with respect to the main unit is seen from obliquely above the side surface of the tablet PC.
Figure 5:
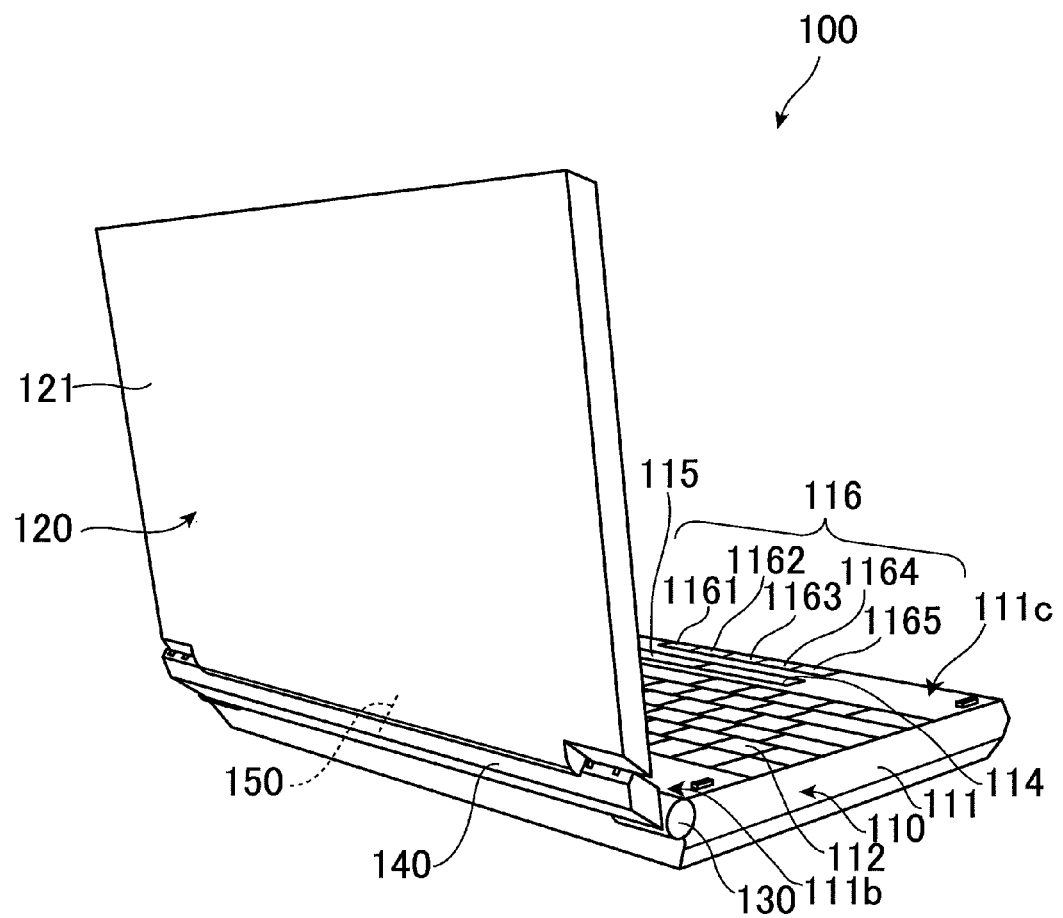
FIG. 5 is an external perspective view in which the tablet PC illustrated in FIG. 4 is seen from obliquely above the rear surface of the tablet PC.
Figure 6:
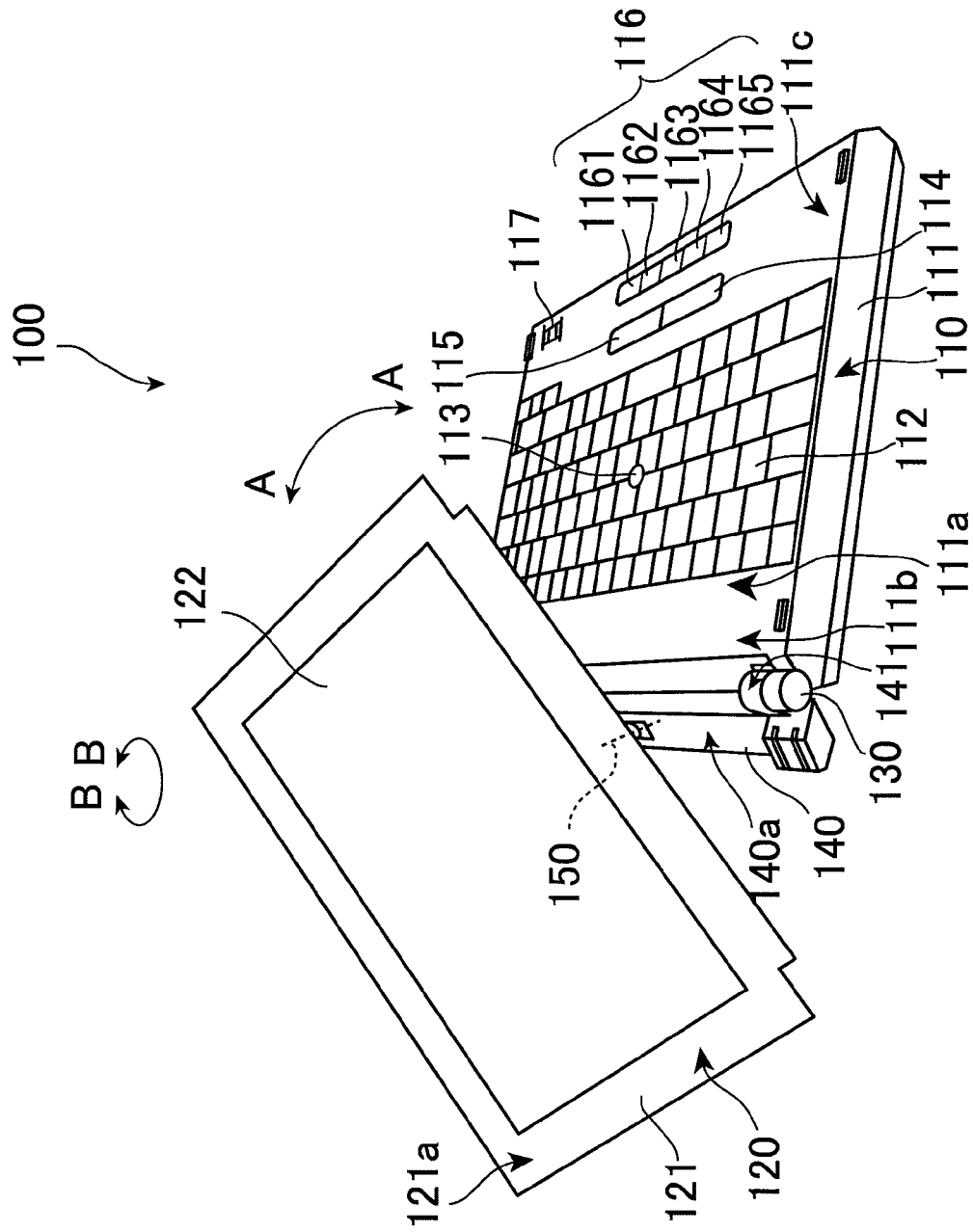
FIG. 6 is an external perspective view in which a rotated state where the image display unit 120 of the tablet PC illustrated in FIG. 4

FIG. 1 is an external perspective view in which a first closed state where a front surface of an image display unit 120 of a tablet PC 100, as an embodiment of the electronic apparatus according to the present invention, is closed toward the upper surface of a main unit 110 is seen from obliquely above a front surface of the tablet PC 100. FIG. 2 is an external perspective view in which the tablet PC 100 illustrated in FIG. 1 is seen from obliquely above a rear surface of the tablet PC 100. FIG. 3 is an external perspective view in which the tablet PC 100 illustrated in FIG. 1 is seen from a side surface of the tablet PC 100. Further, FIG. 4 is an external perspective view in which an opened state where the image display unit 120 of the tablet PC 100 illustrated in FIG. 1 to FIG. 3 is opened with respect to the main unit 110 is seen from obliquely above the side surface of the tablet PC 100. FIG. 5 is an external perspective view in which the tablet PC 100 illustrated in FIG. 4 is seen from obliquely above the rear surface of the tablet PC 100. Further, FIG. 6 is an external perspective view in which a rotated state where the image display unit 120 of the tablet PC 100 illustrated in FIG. 4 and FIG. 5 is rotated with respect to the main unit 110 is seen from obliquely above the side surface of the tablet PC 100.

The tablet PC 100 illustrated in FIG. 1 to FIG. 6 has the same processing capability as that of a common personal computer, and includes a hard disk device and a CPU (Central Processing Unit).

The tablet PC 100 illustrated in FIG. 1 to FIG. 6 includes the main unit 110 having a first housing 111, and the image displaying unit 120 having a second housing 121 which is freely opened and closed with respect to the first housing 111 in the arrow direction A-A, and which is freely rotated with respect to the first housing 111 in the arrow direction B-B. Further, in the first housing 111, a front end surface 111d of the first housing 111 is formed by inclined surfaces which connect the upper surface 111a and the bottom surface 111e of the first housing 111 to each other. The first housing 111 corresponds to an example of the first housing according to the present invention, and the second housing 121 corresponds to an example of the second housing according to the present invention. In FIG. 1 to FIG. 3, there is illustrated the tablet PC 100 in a first closed state where a front surface 121a of the second housing 121 of the image display unit 120 is closed toward the upper surface 111a of the first housing 111 of the main unit 110. Further, in FIG. 4 and FIG. 5, there is illustrated the tablet PC 100 in an opened state where the image display unit 120 is opened with respect to the main unit 110. Further, in FIG. 6, there is illustrated the tablet PC 100 in a rotated state where the image display unit 120 is rotated with respect to the main unit 110.

As illustrated in FIG. 1 to FIG. 6, the tablet PC 100 includes: a first shaft 130 including a pair of members which are respectively arranged at a rear edge 111b of the first housing 111 and which form a rotation shaft in parallel with the rear edge 111b; a rotation member 140 which is freely rotated with friction with the first shaft 130 as a rotation shaft in the arrow direction A-A with respect to the first housing 111; and a second shaft 150 which connects a center section of a lower edge 121b of the second housing 121 in the opened state of the second housing 121 to a center section of an upper edge 140a of the rotation member 140 in a freely rotatable manner in the arrow direction B-B. Further, the second shaft 150 is configured to be perpendicular to the first shaft 130, and is also configured, when the second housing 121 is vertically opened, to be inclined at 45° in the direction that an upper portion of the second shaft 150 is tilted forward. Further, the lower edge 121b of the second housing 121 in the opened state of the second housing and the upper edge 140a of the rotation member 140 are surfaces both perpendicular to the second shaft 150.

In such manner, the lower edge 121b and the upper edge 140a are surfaces both perpendicular to the second shaft 150, and thus a gap between the lower edge 121b and the upper edge 140a is designed so as to be minimized. Further, the rotation member 140 is configured to be freely rotated with friction with respect to the first housing 111, so that the attitude of the second housing 121 in the opened state may be held at a desired position.

Further, the rotation member 140 includes at both ends thereof two connecting sections 141 which are formed from a pair of members and respectively connected to the first shaft 130. This enables the rotation member 140 to be stably rotated with respect to the first housing 111.

The first shaft 130 corresponds to an example of the first shaft according to the present invention, and the rotation member 140 corresponds to an example of the rotation member according to the present invention. Also, the second shaft 150 corresponds to an example of the second shaft according to the present invention. Further, the connecting section 141 corresponds to an example of the connecting section according to the present invention.

Further, as illustrated in FIG. 4 to FIG. 6, in the main unit 110 of the tablet PC 100, a keyboard 112 having plural operation keys arranged therein, a trackball 113, a left click button 114, and a right click button 115 are arranged on the upper surface 111a of the first housing 111 of the main unit 110. Further, a push button type security/tablet button 116, which includes five buttons operated by a user, is arranged at the central portion of a partial area 111c of the front edge side of the upper surface 111a of the first housing 111. The security/tablet button 116 corresponds to an example of the push button according to the present invention. As the five buttons included in the security/tablet button 116, a first button 1161, a second button 1162, a third button 1163, and a fourth button 1164 and an ENT button 1165 are arranged in this order from the right side toward the security/tablet button 116.

Each of the first button 1161, the second button 1162, the third button 1163, and the fourth button 1164 is a button used to input a password at login by an operator. Further, the ENT button 1165 is a button used at the time of determining the inputted password.

Further, when the first button continues to be depressed for two seconds or more after the tablet PC 100 is started, the same processing as that in the case where the Ctrl key, the Alt key and the Del key in the keyboard 112 are simultaneously depressed is performed, so that the system may be forcibly terminated.

Further, each time the second button 1162 is depressed after the tablet PC 100 is started, the whole image displayed on a display screen 122 is changed by 90°, and hence the display screen 122 may be used in both longitudinal and lateral directions.

Further, the third button 1163 and the fourth button 1164 are buttons to which desired functions may be respectively assigned by the operator. When after the tablet PC is started, the third button 1163 or the fourth button 1164, to which predetermined functions are respectively assigned, is depressed and then the ENT button 1165 is depressed, the assigned function is performed. Note that the ENT button 1165 corresponds to the Enter key of the keyboard 112.

As illustrated in FIG. 4 and FIG. 6, a fingerprint sensor 117 which performs user authentication by identifying a fingerprint is arranged at the right end portion of the partial area 111*c* on the front edge side. The fingerprint sensor 117 corresponds to an example of the fingerprint sensor according to the present invention.

Further, as illustrated in FIG. 4 and FIG. 6, in the image display unit 120 of the tablet PC 100, the display screen 122 which displays an image is arranged on the front surface 121*a* of the second housing 121 of the image display unit 120. The display screen 122 corresponds to an example of the display screen according to the present invention. The display screen 120 has a pen input function including an electromagnetic induction type digitizer which detects a contact or an approach of a dedicated pen and a finger (both not illustrated). Note that as the digitizer, it is also possible to adopt a resistance film type digitizer which is referred to as a so-called touch panel.

Figure 7:
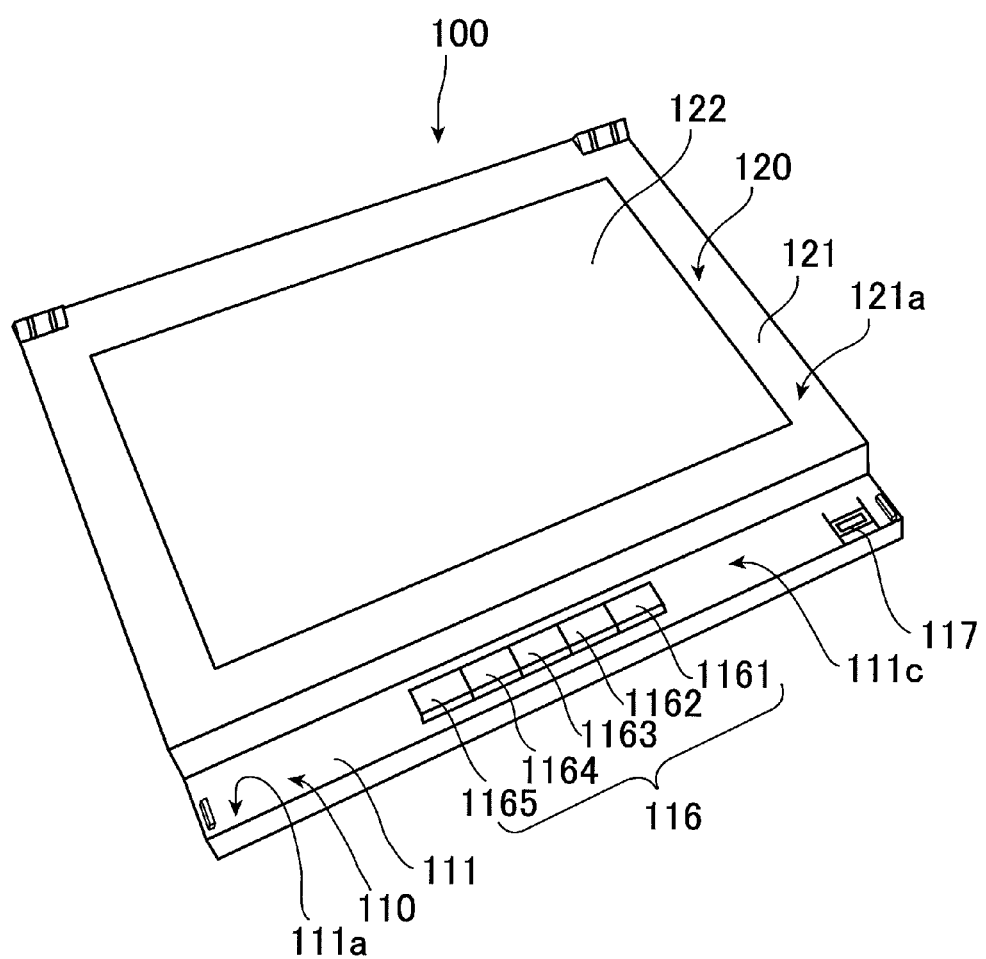
FIG. 7 is an external perspective view in which a second closed state where the rear surface opposite to the front surface of the image display unit of the tablet PC illustrated in FIG. 1 to FIG. 6 is closed toward the upper surface of the main unit is seen from obliquely above the front surface of the tablet PC.
Figure 8:
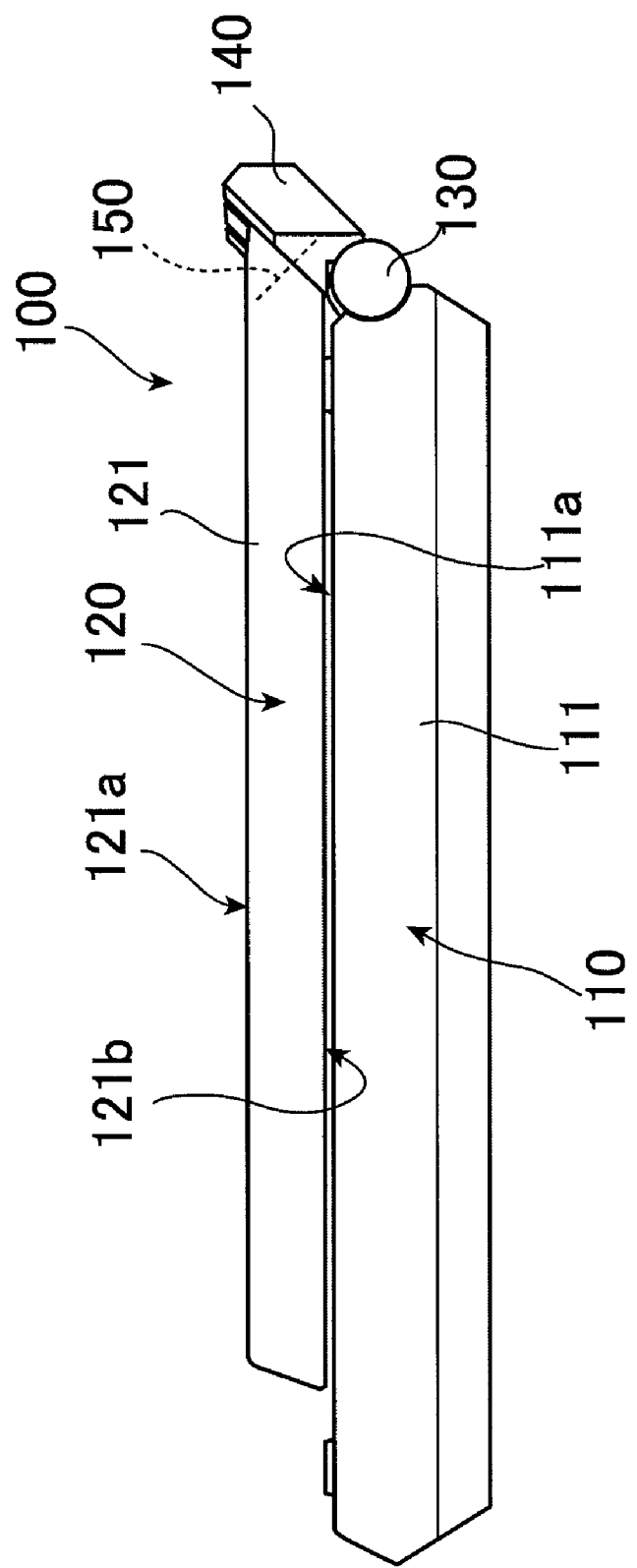
FIG. 8 is an external perspective view in which the tablet PC illustrated in FIG. 7 is seen from the side surface of the tablet PC.
Figure 9:
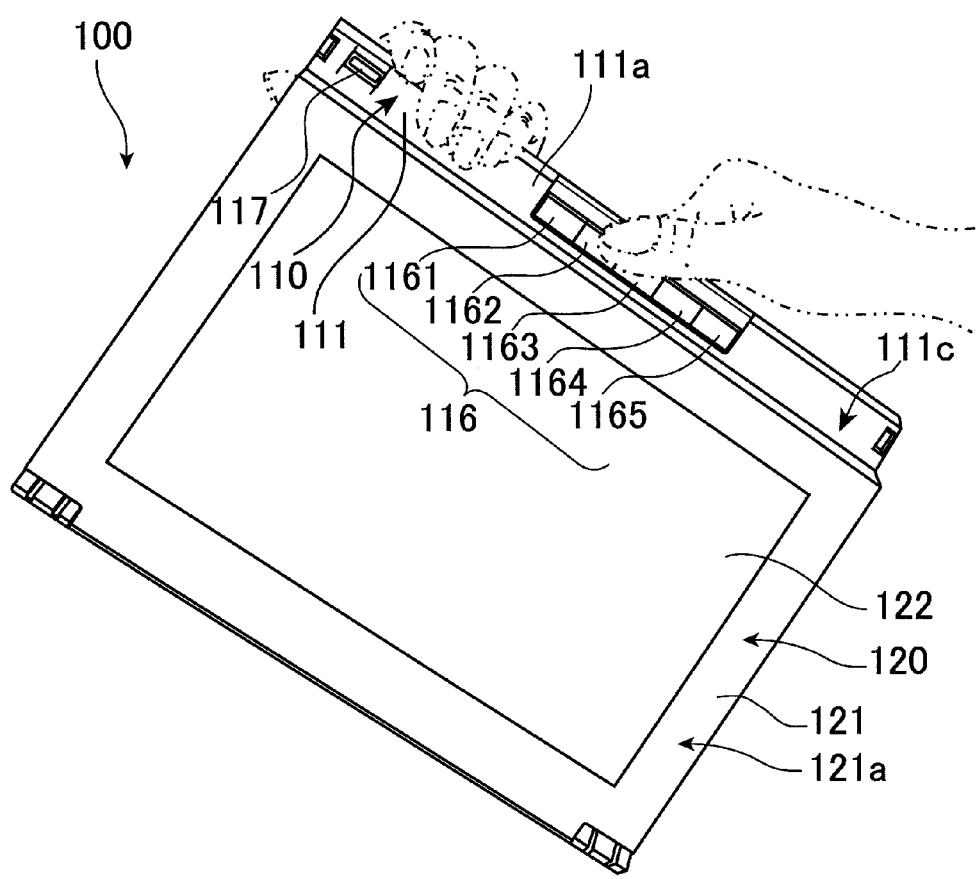
FIG. 9 is an external perspective view of the state where the tablet PC illustrated

FIG. 7 is an external perspective view in which a second closed state where the rear surface opposite to the front surface of the image display unit 120 of the tablet PC 100 illustrated in FIG. 1 to FIG. 6 is closed toward the upper surface of the main unit 110 is seen from obliquely above the front surface of the tablet PC 100. FIG. 8 is an external perspective view in which the tablet PC 100 illustrated in FIG. 7 is seen from the side surface of the tablet PC 100. FIG. 9 is an external perspective view of the state where the tablet PC 100 illustrated FIG. 7 is grasped by the user.

In FIG. 7 to FIG. 9, there is illustrated the tablet PC 100 in the second closed state where the rear surface 121*b* opposite to the front surface 121*a* of the second housing 121 of the image display unit 120 is closed toward the upper surface 111*a* of the first housing 111 of the main unit 110.

As described with reference to FIG. 1 to FIG. 6, the tablet PC 100 is configured such that the center section of the upper edge 140*a* of the rotation member 140 which is freely rotated with friction with respect to the first housing 111 in the arrow direction A-A by using, as a rotation shaft, the first shaft 130 which forms the rotation shaft in parallel with the rear edge 111*b* of the first housing 111, and the center section of the lower edge 121*b* of the second housing 121 which is freely opened and closed with respect to the first housing in the arrow direction A-A and which is freely rotated in the arrow direction B-B in the opened state, are connected to each other rotatably in the arrow direction B-B by the second shaft 150 which is perpendicular to the first shaft 130, and which, when the second housing 121 is in the vertically opened state, is inclined at 45° in the direction in which the upper portion of the second shaft 150 is tilted forward.

Therefore, as illustrated in FIG. 7 to FIG. 9, in the second closed state where the rear surface 121*b* opposite to the front surface 121*a* of the second housing 121 is closed toward the upper surface 111*a* of the first housing 111, the partial area 111*c* on the front edge side of the upper surface 111*a* of the first housing 111 is exposed.

The front edge side partial area 111*c* which is exposed in the second closed state has a relatively sufficient margin in space as compared with the area between the keyboard 112 and the left edge or the area between the keyboard 112 and the right edge. Thus, according to the tablet PC 100 of the present embodiment in which the security/tablet button 116 including the first button 1161, the second button 1162, the third button 1163, and the fourth button 1164, and the ENT button 1165, and the fingerprint sensor 117 are arranged in the front edge side partial area 111*c*, it is not necessary that in order to arrange the security/tablet button 116, and the fingerprint sensor 117, the size of the first housing 111 is increased and the length in the lateral width direction of the area for arranging the keyboard 112 is reduced. Therefore, neither the portability nor the operability of the keyboard 112 is sacrificed. Further, even in the opened state where the second housing 121 is opened with respect to the first housing 111, and also in the second closed state described above, it is possible to operate the security/tablet button 116 and to perform user authentication with the fingerprint sensor 117, and accordingly it is possible to obtain excellent operability. Further, as described above, the front edge side partial area 111*c* has a relatively sufficient space, so that the size of the security/tablet button 116 may be sufficiently secured.

Further, according to the tablet PC 100 of the present embodiment configured such that the circuit board on which the CPU for performing operation processing and the electronic circuit are mounted, and the hard disk which stores information, are incorporated in the first housing on which the keyboard 112 is arranged, and such that the security/tablet button 116 and the fingerprint sensor 117 are arranged in the front edge side partial area 111*c*, the risk of failures due to a wire breakage, and the like, is reduced as compared with the conventional electronic apparatus in which the security/tablet button and the fingerprint sensor are arranged at the side of the display screen arranged on the second housing which is freely opened and closed with respect to the first housing and which is freely rotated with respect to the first housing, and as compared with the conventional electronic apparatus in which the image of security/tablet button is displayed on the display screen.

Further, it is not necessary that the security/tablet button and the fingerprint sensor are arranged at the side of the display screen 122 which is arranged on the second housing 121, and that the image of the security/tablet button is displayed on the display screen 122. Thus, it is possible to extend the display screen 122 as close as possible to the end of the second housing 121, and it is also possible to avoid a decrease of the image display area by displaying the security/tablet button on the display screen 122. Further, it is not necessary that the security/tablet button and the fingerprint sensor are arranged at the side of the display screen 122 which is arranged on the second housing 121, and that the image of the security/tablet button is displayed on the display screen 122. Thus, in the state where the second housing 121 is opened with respect to the first housing 111, it is possible to avoid an unintentional rotation of the second housing 121 at the time when the tablet PC 100 is operated with a finger or a pen.

Further, as illustrated in FIG. 7 to FIG. 9, the second housing 121 does not laterally project over the first housing 111 in the second closed state. Therefore, it is significantly less likely that the rotation moment is made to act with the second shaft 150 as the rotation shaft in such a case where a load is applied to the front surface 121a of the second housing 121, for example, by putting an arm on the front surface 121a. Thus, the tablet PC 100 of the present embodiment is excellent in the stability.

Further, the tablet PC 100 needs to be carefully operated so as not to be dropped at the time when the tablet PC 100 is operated with the pen in the second closed state. As illustrated in FIG. 7 to FIG. 9, according to the tablet PC 100 of the present embodiment, the thickness of the exposed portion of the first housing 111 is reduced by the portion in which the second housing 121 does not overlap with the first housing 111. Thus, the tablet PC 100 of the present embodiment is excellent in the holding property in the second closed state.

Note that in the above described embodiment, there is described an example in the case where the electronic apparatus according to the present invention is the tablet PC, but the electronic apparatus according to the present invention is not limited to this. The present invention may be applied to an electronic apparatus, such as, for example, a portable telephone, a portable information terminal, and an electronic dictionary, as long as the electronic apparatus includes a first housing, and a second housing which is freely opened and closed with respect to the first housing and which is freely rotated with respect to the first housing.

Further, in the above described embodiment, there is described an example in the case where, when the second housing 121 is in the vertically opened state, the second shaft according to the present invention is inclines at 45° in the direction in which the upper portion of the second shaft is tilted forward, but the second shaft according to the present invention is not limited to this. The second shaft may be inclined in the direction that the upper portion of the second shaft is tilted forward, at the time when the second housing is in the vertically opened state.

Further, in the above described embodiment, there is described an example in the case where the operation members according to the present invention are the push button type security/tablet button 116, and the fingerprint sensor 117, but the operation members according to the present invention are not limited to these. Any operation member, such as, for example, a slide button, may also be used as long as the operation member is operated by the user.

Further, in the above described embodiment, there is described an example in the case where the rotation member according to the present invention is freely rotated with friction with respect to the first housing 111, but the rotation member according to the present invention is not limited to this. Any member may be used as long as the member is freely rotated with respect to the first housing.

Further, in the above described embodiment, there is described an example in the case where in the opened state of the second housing according to the present invention, the lower edge 121b of the second housing and the upper edge 140a of the rotation member according to the present invention are both surfaces perpendicular to the second shaft 150. However, the upper edge and the lower edge according to the present invention are not limited to these.

Further, in the above described embodiment, there is described an example in the case where the first shaft 130 according to the present invention is formed from a pair of members, and where the rotation member according to the present invention includes at both ends thereof two connecting sections 141 which are respectively connected to the pair of members forming the first shaft 130. However, the first shaft and the rotation member according to the present invention are not limited to these.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has(have) been described in detail, it should be understood that the various changes, substitutions, and alterations could be made hereto without departing from the spirit and scope of the invention.

What is claimed is:

1. An electronic apparatus comprising:
   a first housing;
   a first shaft that is arranged at an edge of the first housing and that forms a rotation shaft in parallel with the edge;
   a second housing that includes a first surface facing the first housing in a first closed state and a first inclined surface which is inclined with respect to the first surface;
   a rotation member that is rotatable with respect to the first housing with the first shaft as a rotation shaft and includes a second surface facing the first inclined surface of the second housing in the first closed state; and
   a second shaft that rotatably connects the second housing with respect to the rotation member, and that is perpendicular to the first inclined surface and the second inclined surface.

2. The electronic apparatus according to claim 1, wherein the first housing includes an upper surface facing the first surface of the second housing in the first closed state and is provided with a key board with a plurality of operation keys arranged therein on the upper surface, and
   the second housing is provided with a display screen to display an image on the first surface.

* * * * *